US006480769B1

(12) United States Patent
Kageyama

(10) Patent No.: US 6,480,769 B1
(45) Date of Patent: Nov. 12, 2002

(54) VEHICLE TRAVEL CONTROL SYSTEM

(75) Inventor: Masato Kageyama, Oyama (JP)

(73) Assignee: Komatsu Ltd., Tokyo (JP)

( * ) Notice: Subject to any disclaimer, the term of this patent is extended or adjusted under 35 U.S.C. 154(b) by 57 days.

(21) Appl. No.: 09/678,842

(22) Filed: Oct. 4, 2000

(30) Foreign Application Priority Data

Oct. 5, 1999 (JP) ........................................... 11-284398

(51) Int. Cl.[7] .................................................. G06F 7/00

(52) U.S. Cl. ............................. 701/23; 701/26; 701/50; 701/210; 701/301

(58) Field of Search ............................. 701/23, 26, 50, 701/70, 72, 205, 207, 210, 213, 220, 300, 301

(56) References Cited

U.S. PATENT DOCUMENTS 6,292,725 B1 * 9/2001 Kageyama et al. ........... 701/30

FOREIGN PATENT DOCUMENTS

JP 62-88006 4/1987
JP 9-269828 10/1997

* cited by examiner

*Primary Examiner*—William A. Cuchlinski, Jr.
*Assistant Examiner*—Edward Pipala
(74) *Attorney, Agent, or Firm*—Varndell & Varndell, PLLC

(57) ABSTRACT

To enable vehicles to travel safely without risk of head-on collision when they have been made to travel on an oncoming lane in order to avoid an obstacle on the original lane. In addition, when travel conditions have been set or changed, it becomes possible to transmit data quickly but a problem of a production efficiency being reduced as a result of all the vehicles being stopped does not arise nor is there a safety problem due to a delay in data changes. On the basis of a monitored result of the travel conditions of the travel track, a no-entry area E is established ahead of a vehicle Jm traveling on one lane of a 2-way dual-lane vehicle track. Then travel instructions are issued to the vehicle Jm, the travel instructions causing it to avoid the no-entry area and travel on a section L of an oncoming lane, a lane whose traffic runs in the opposite direction to the one lane. Travel instructions are issued to an oncoming vehicle Jt traveling on the oncoming lane which prohibits entry to the section L. In addition, an upper limit velocity is set on the section L. Then, travel conditions, including the upper limit velocity set for the section 47, are issued as the travel instructions to the vehicle. When the travel instructions are issued to the vehicle, the vehicle travels on the section 47 at a velocity which does not exceed the upper limit velocity.

10 Claims, 7 Drawing Sheets

VEHICLE TRAVEL CONTROL SYSTEM

BACKGROUND OF INVENTION

1. Field of the Invention

This invention relates to a vehicle travel control system which controls the travel of a plurality of unmanned or manned vehicles.

2. Description of the Related Art

In extensive mine sites and the like, it is necessary to convey ore one way over several tens of kilometers by means of dump trucks. In this type of industry, the use of unmanned vehicles has become widespread. Position measuring devices such as GPS (Global Positioning System) are provided in the vehicles and this position measuring device is used to compare continuously the position measured using the position measuring device and the recorded course data and the two are adjusted so that they correspond. By this means, the unmanned vehicle travels along the predetermined course.

Apart from the unmanned vehicles (dump trucks), there are various types of service vehicles on the travel track in an extensive mine site such as graders and water sprinklers, conveying vehicles carrying excavators, and light vehicles conveying operators and performing maintenance operations.

The velocity of these various types of vehicle varies to a great extent. Vehicles such as graders have an extremely low velocity of approximately 7 km while they are operating, while vehicles such as dump trucks and light vehicles travel at a high velocity (of the order of 50 km). For this reason, the low-velocity vehicles constitute an obstacle for the high velocity vehicles. In addition, vehicles which have broken down ahead and fallen rocks and the like also constitute obstacles.

For this reason, when there is a grader ahead of a dump truck (unmanned vehicle) performing repair operations at extremely low velocity, and there is a broken down vehicle or fallen rock or the like ahead of the dump truck (unmanned vehicle) there is no choice but to interrupt the conveying operations using the dump trucks until the grading operations have been completed or the obstacle has been removed. Interrupting the conveying operations reduces the operating efficiency. In particular, in seasons when there is a lot of rain, it is necessary to perform grading operations with rapid succession and the reduction in the operating frequency is felt keenly.

In the prior art, various inventions have been applied for patents and publicized in which, when there is an obstacle ahead of a unmanned vehicle, the obstacle is detected with an obstacle detector and on the basis of this detection a track permitting the obstacle to be avoided is sought and that evasive track is adopted.

For example, Japanese Patent Application Laid-Open No. 62-88006 has disclosed an invention in which, if an obstacle has been discovered by means of an obstacle sensor, the direction in which there is no obstacle is determined by changing the direction in which the vehicle is facing and the vehicle is made to move in the direction determined.

In addition, Japanese Patent Application Laid-Open No. 9-269828 discloses an invention in which, if there is an obstacle ahead of a unmanned vehicle, the vehicle is made to travel along a guide provided on the underlying surface, and if an obstacle is detected by means of sensors, a bypass track away from the guide is determined and the unmanned vehicle is made to move along this bypass track.

However, these technologies are based on the presumption that there are sufficiently extensive, level areas on which the unmanned vehicle can travel to the side of the path on which it travels in such covered travel tracks over short distances. In outdoor industrial facilities such as mines where the travel track distances extend in one direction over an as long stretch as several tens of kilometers and it is not possible to ensure that there are flat and sufficiently large areas for vehicles to pass etc., it is not possible to apply such technology as it is.

In addition, for example, even if it were possible to provide passing level areas on both sides of the travel track, there is the fear that the side of the track will collapse under the weight of large dump trucks. In fact, when laden the dump trucks' weight exceeds 200 t. For this reason, when vehicles pass on the shoulder of the track which is fragile and has not been maintained, there is also the risk that the tires will become stuck and in the worst case the vehicles may slip of the track and fall. In addition, there is the problem of correctly implementing the means for sensing the state of the surface of the shoulder of the track.

On extensive mine sites, there is generally a 2-way dual lane vehicle track. For this reason, if there is an obstacle present ahead of the vehicle, a system has been devised in which the vehicles are made to pass the obstacle by traveling on the oncoming lane of the track. Because the oncoming lane is maintained, the abovementioned problems such as the risk of getting stuck and of collapse of the shoulder which are due to insufficient maintenance of areas such as the shoulder of the track do not occur. However, as a result of the vehicles being made to travel on the oncoming track, there is the risk of a head on collision.

When there are manned vehicles traveling on the oncoming lane, it is not possible to anticipate when a unmanned vehicle will disrupt the oncoming lane. For this reason, it is difficult to avoid the risk of head-on collisions. In addition, if the oncoming vehicle is also a unmanned vehicle, it is not possible to stop at a safe position after confirming the presence of passing vehicles by means of sensors mounted on the vehicles. This is because the effective detection range of obstacle sensors is limited. After detecting stationary obstacles with an obstacle sensor, it is possible to maintain a sufficient stopping distance and stop safely, but after detecting vehicles traveling at high velocity it is not possible to maintain sufficient stopping distance and stop safely For this reason, it is not possible to avoid the risk of head-on collisions.

In the prior art as mentioned above, when vehicles are made to travel on the oncoming lane in order to avoid obstacles on their original lane, vehicles on the oncoming lane cannot maintain sufficient stopping distance and there is a risk of a head-on collision.

The present invention is designed with the above circumstances in mind, and resolves the first problem by making it possible that when vehicles are made to travel on the oncoming lane in order to avoid an obstacle on their original lane, there is no risk of a head-on collision and the vehicles can pass safely.

In contrast to unmanned vehicles which travel in covered factories and the like, the travel condition of the unmanned vehicles which travel outdoors in places such as mines is changed according to the various external factors.

For example, not only are there sometimes obstacles such as broken down vehicles and fallen rocks on the travel track on which the vehicles are traveling, but also the surface of the travel track is in some cases degraded by rainfall and sprayed water and the effective range of the sensors is shortened. In addition, on a mine site, because the surface on which the vehicles travel is paved, only part of the surface of the track becomes muddy and slippery.

Therefore, in view of such things as the aforementioned changes in the state of the travel track, it is necessary to bring about changes in the travel conditions such as the position and velocity of the vehicles in order to be able to ensure safety.

In extensive industrial sites according to the prior art, if changes are brought about in the travel conditions of the vehicles, the data on the travel conditions of the entirety of the extensive travel tracks has to be updated and this updated data has to be transmitted to all the vehicles.

The radio load when attempting to transmit the data relating to the travel conditions of the entirety of the aforementioned extensive travel tracks becomes extremely large. A method is adopted in which data is transmitted to all the vehicles after all they have all been temporarily stopped. However, the problem with temporarily stopping all the vehicles is that it reduces the production efficiency. In addition, instead of adopting a method in which the vehicles are temporarily stopped, a method is adopted in which data relating to the travel conditions of the entirety of the extensive travel tracks is converted into compact data and transmitted over a long period. However, when compact data is transmitted over long periods, there is a long delay until all the changes to the data are completed. For this reason, there is a safety problem that interference is generated among the vehicles as a result of this delay.

This invention is designed to deal with such a situation, and it resolves the second problem by enabling data to be transmitted quickly when the travel conditions have been set or changed but does not cause the production efficiency to be reduced as a result of all the vehicles being stopped or give rise to a safety problem due to the delay in the data changes.

In some cases manned vehicle travel tracks are temporarily provided in such way that they intersect with the unmanned vehicle travel tracks. In this case, it is necessary to temporarily stop the unmanned vehicles just before reaching that temporarily provided travel track. However, in this case also, data relating to the travel conditions of all the travel tracks of the extensive site has to be updated and this updated data has to be transmitted to all the vehicles.

For this reason, as mentioned above, there is a problem that stopping all the vehicles reduces the efficiency and there is a safety problem due to the delay in the data changes.

SUMMARY OF THE INVENTION

The present invention is designed with this situation in mind, and it resolves the third problem by enabling data to be transmitted quickly if it has become necessary to temporarily stop the vehicles, but does not cause the production efficiency to be reduced as a result of all the vehicles being stopped or give rise to a safety problem due to the delay in the data changes.

In order to resolve the aforementioned first problem, a first aspect of the present invention is defined in that a vehicle travel control system in which travel conditions of a travel track made up of 2-way dual-lane vehicle tracks on which a plurality of vehicles travel are monitored by a monitor station, and travel instructions are issued to the plurality of vehicles from the monitor station; comprising means for setting a no-entry area which, on the basis of the monitored result of the travel conditions of the travel track, sets the no-entry area ahead of one of the vehicles traveling on one lane of the 2-way dual-lane vehicle track;

first instruction means which issues to the one of the vehicles travel instructions which cause the vehicle to avoid the no-entry area and travel on a section of an oncoming lane whose traffic runs in an opposite direction to the one lane; and second instruction means which issues to an oncoming vehicle traveling on the oncoming lane travel instructions which prohibit entry to the section of the oncoming lane.

In addition, a second aspect of the present invention is defined in that the first aspect of the invention further comprises means for setting a prohibited section in which it is prohibited for one of the vehicles to travel on the oncoming lane; wherein, if the section of the oncoming lane is not the prohibited section, the first instruction means and the second instruction means issue the travel instructions to the one of the vehicles and to the oncoming vehicle.

The first and second aspects of the invention will be explained with reference to FIGS. 6(*a*) and 6(*b*).

In the first and second aspects of the invention, no-entry areas E are established ahead a vehicle Jm traveling on one lane of a 2-way dual-lane vehicle track, on the basis of the monitored result of the travel state of the travel track. Then travel instructions are issued to the vehicle Jm traveling on one lane, the travel instructions causing them to avoid the no-entry area E and travel on part of a section L of an oncoming lane, a lane whose traffic runs in the opposite direction to the aforementioned lane. Travel instructions are issued to an oncoming vehicle Jt traveling on the oncoming lane which prohibit entry to the part of the track section L. In this way, even if the vehicle Jm on one lane avoid a no-entry area E ahead of them and travel on the oncoming lane, there is no risk of a head-on collision between the vehicle Jm on one lane and the vehicle Jt traveling on the oncoming lane and they can travel safely.

In addition, in order to resolve the aforementioned second problem, a third aspect of the present invention is defined in that a vehicle travel control system in which travel conditions of a travel track on which a vehicle travels are set by a monitor station and travel instructions corresponding to the travel conditions are issued to the vehicle by the monitor station; comprising means for setting an upper limit velocity which sets the upper limit velocity on a section of the travel track; and instruction means for issuing, as the travel instructions to the vehicle, travel conditions including the set upper limit velocity for the section of the travel track;

wherein, when the travel instructions are issued by the instruction means, the vehicle travels on the section of the travel track at a velocity which does not exceed the upper limit velocity.

The third aspect of the invention will be explained with reference to FIG. 4.

In the third aspect of the invention, a velocity limit is set on the section 47 of the track. Then, travel conditions, including the aforementioned upper limit velocity set for the section 47, are issued as travel instructions to the aforementioned vehicle. If travel instructions have been issued to the vehicle, the aforementioned vehicle travels on the section 47 of the aforementioned travel track at a velocity which does not exceed the aforementioned upper limit velocity.

In this way, in the third aspect of the invention, the data transmission load is minimized because the travel conditions are not updated for all the sections of the travel tracks and it is possible to regenerate and transmit, as travel instructions, only travel conditions relating to the section 47. For this reason, when the travel conditions are set or changed it becomes possible to transmit data quickly but the problem of the production efficiency being reduced as a result of all the vehicles being stopped does not arise nor is there a safety problem due to the delay in the data changes.

In addition, a fourth aspect of the present invention is defined in that a vehicle travel control system in which travel conditions of a travel track system on which a vehicle travels are changed by a monitor station and travel instructions corresponding to the changed travel conditions are issued to the vehicle from the monitor station; comprising travel velocity changing means for changing a travel velocity on a section of the travel track; and instruction means for issuing, as the travel instructions to the vehicle, travel conditions including the changed travel velocity for the section of the travel track;

wherein, when the travel instructions are issued by the instruction means, the vehicle travels on the section of the travel track at the changed velocity.

The fourth aspect of the invention will be explained with reference to FIG. 4.

In the fourth aspect of the invention, the travel velocity in the section 47 of the travel track is changed. Then, travel conditions including the aforementioned changed travel velocity for the section 47 are issued to the vehicle as travel instructions. If travel instructions are issued, the vehicle travels on the section 47 at a changed velocity.

In this way, in the fourth aspect of the invention, the data transmission load is minimized because the travel conditions are not updated for all the sections of the travel tracks and it is possible to regenerate and transmit, as travel instructions, only travel conditions relating to the section 47. For this reason, when the travel conditions have been set or changed it becomes possible to transmit data quickly but the problem of the production efficiency being reduced as a result of all the vehicles being stopped does not arise nor is there a safety problem due to the delay in the data changes.

In addition, a fifth aspect of the present invention is defined in that a vehicle travel control system which is applied to a travel track on which a vehicle slips in accordance with a lateral acceleration applied in a lateral direction relative to a direction of travel of the vehicle, and in which travel conditions for the travel track on which the vehicle is traveling are set by a monitor station and travel instructions corresponding to the travel conditions are issued to the vehicle by the monitor station; comprising lateral acceleration setting means for setting an upper limit value for the lateral acceleration on a section of part of the travel track; and instruction means for issuing, as the travel instructions to the vehicle, travel conditions including an upper limit velocity corresponding to the lateral acceleration for the section of the part of the travel track;

wherein, when the travel instructions are issued by the instruction means, the vehicle travels on the section of the travel track at a velocity not exceeding the upper limit velocity.

The aforementioned fifth aspect of the invention will be explained with reference to FIG. 4.

In the fifth aspect of the invention, an upper limit value is set for the lateral acceleration on the section 47 of the travel track. Then, travel conditions including an upper limit velocity corresponding to the aforementioned lateral acceleration for the aforementioned section are issued as travel instructions to the vehicles. If travel instructions. are issued, the vehicle travels on the section 47 of the aforementioned travel track at a velocity not exceeding the aforementioned upper limit velocity.

In this way, in the fifth aspect of the invention, the data transmission load is minimized because the travel conditions are not updated for all the sections of the travel tracks and it is possible to regenerate and transmit, as travel instructions, only travel conditions relating to the section 47. For this reason, when the travel conditions have been set or changed it becomes possible to transmit data quickly but the problem of the production efficiency being reduced as a result of all the vehicles being stopped does not arise nor is there a safety problem due to the delay in the data changes.

In addition, a sixth aspect of the present invention is defined in that a vehicle travel control system in which travel conditions of a travel track system on which a vehicle travels are set by a monitor station and travel instructions corresponding to the travel conditions are issued to the vehicle by the monitor station, comprising:

means for setting a stopping point which sets at one point on the travel track a stopping point at which the vehicle is supposed to stop traveling; and instruction means for issuing, as the travel instructions to the vehicle, travel conditions including the stopping point, wherein when the travel instructions are issued by the instruction means, the vehicle stops at the stopping point.

The aforementioned sixth aspect of the invention will be explained with reference to FIG. 4.

In the sixth aspect of the present invention, a stopping point at which the vehicle is supposed to stop traveling is defined at a certain point 49 on the travel track. Then, travel conditions including the aforementioned stopping points 49 are issued to the vehicle as travel instructions. If travel instructions have been issued, the vehicle stops traveling at a stopping point 49.

In the sixth aspect of the invention, the data transmission load is minimized because the travel conditions are not updated for all the sections of the travel tracks and it is possible to regenerate and transmit, as travel instructions, only travel conditions relating to a certain stopping point 49. For this reason, it becomes possible to transmit data quickly when it becomes necessary to stop the vehicle temporarily but the problem of the production efficiency being reduced as a result of all the vehicles being stopped does not arise nor is there a safety problem due to the delay in the data changes.

A seventh aspect of the present invention is defined in that if, in the aforementioned third to sixth aspects of the invention, when the travel instructions are issued by the instruction means, the vehicle gradually decreases a travel speed so as to reach a velocity instructed for the section or so as to stop traveling at the stopping point.

In the seventh aspect of the invention, if travel instructions are issued to the aforementioned vehicle, the travel velocity is gradually decreased until the velocity stipulated in the instruction is reached. In addition, the travel velocity is gradually decreased until the vehicle stops at the stopping point 49. This makes it possible to prevent the vehicle rolling over and the like.

DESCRIPTION OF THE PREFERRED EMBODIMENTS

Embodiments of the vehicle travel control system according to the present invention are explained below with reference to the figures.

One embodiment of the vehicle travel control system is structured such that the monitor station 30 controls both unmanned vehicles 10 and manned vehicles 20. In this embodiment of the present invention, it is assumed that on an extensive industrial site there is a plurality of unmanned vehicles 10 and manned vehicles 20, represented by dumper trucks, (mine site or the like) which carry out load conveying operations. On the extensive mine site, 2-way, dual-lane travel tracks are provided on which unmanned vehicles 10 and manned vehicles 20 travel.

Figure 1:
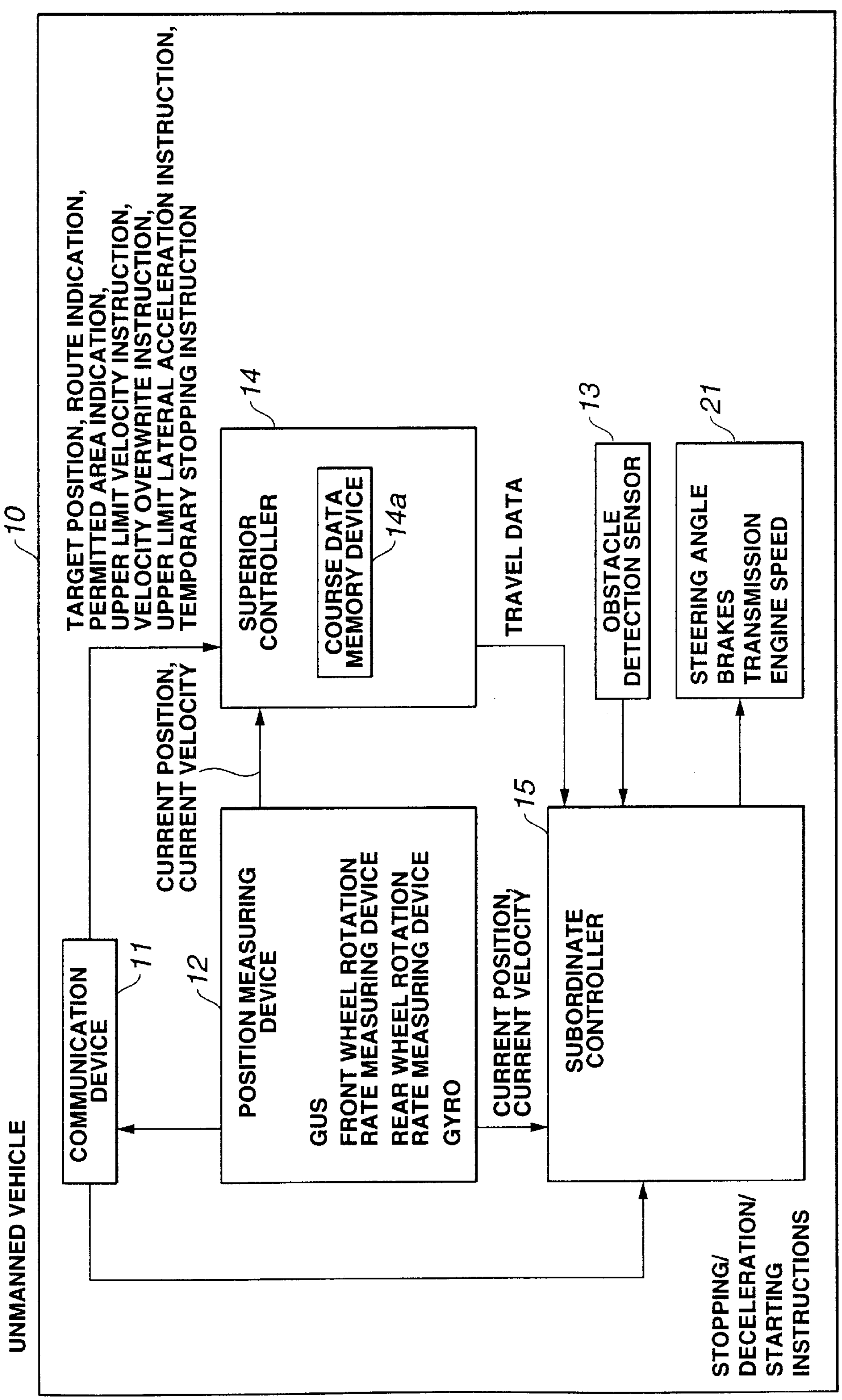
FIG. 1 is a functional block diagram showing the constitution of a unmanned vehicle according to an embodiment of the invention.
Figure 2:
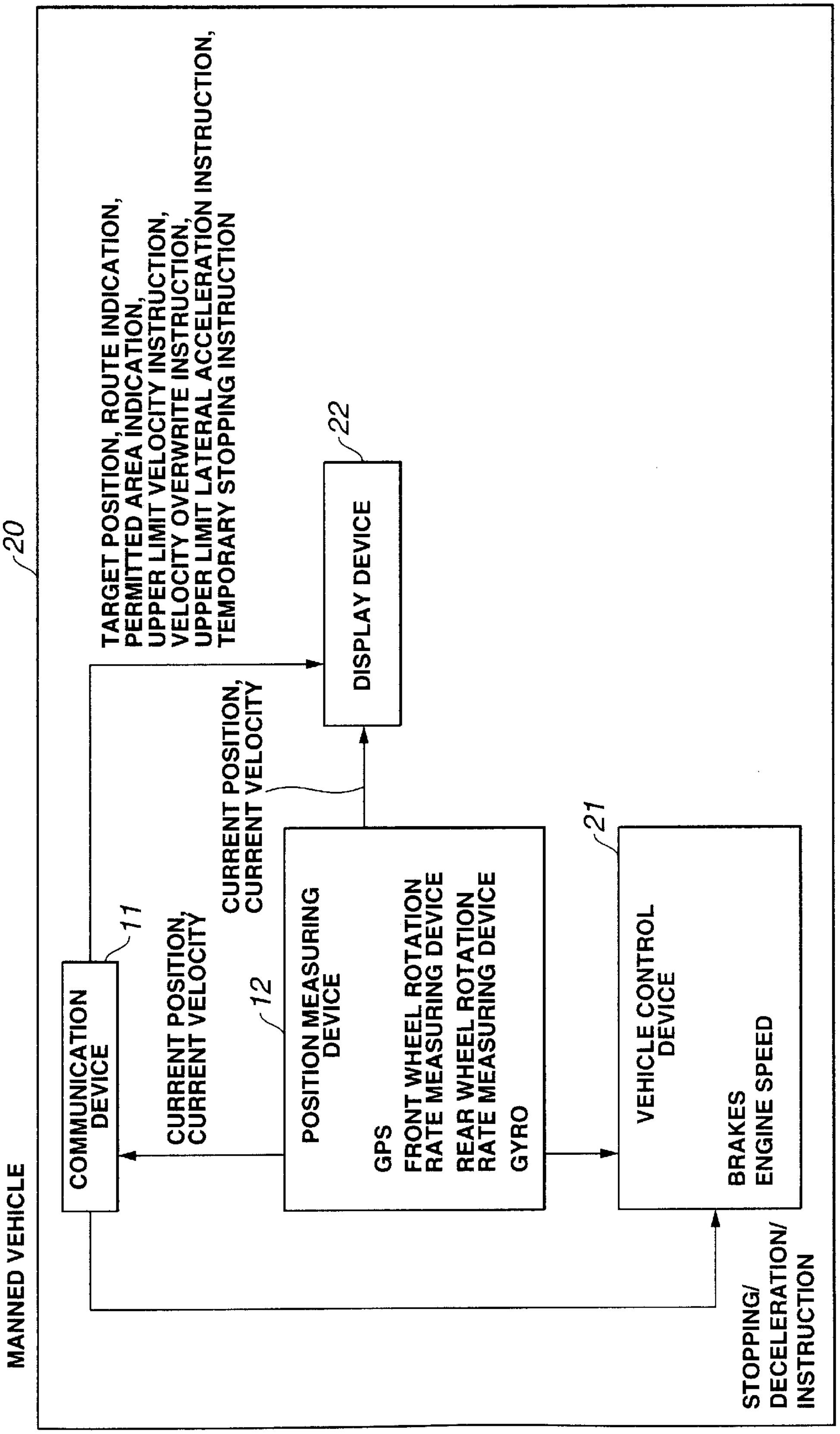
FIG. 2 is a functional block diagram showing the constitution of manned vehicles according to an embodiment of the invention.
Figure 3:
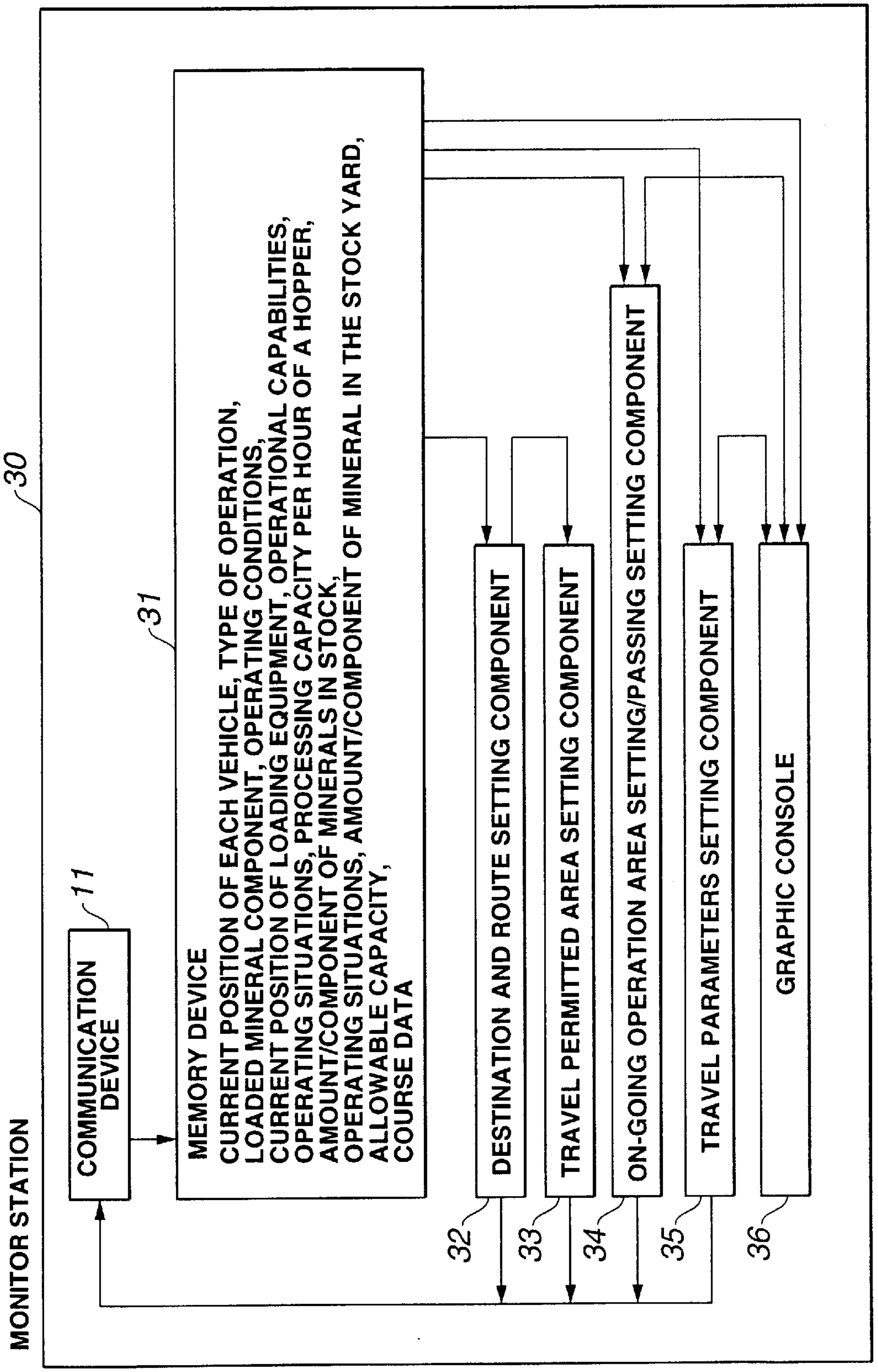
FIG. 3 is a functional block diagram showing the constitution of a monitor station according to an embodiment of the invention.

FIG. 1 is a functional block diagram showing the constitution of an embodiment of a unmanned vehicle 10. In addition, FIG. 2 is a functional block diagram showing an embodiment of a constitution of an embodiment of a manned vehicle 20. In addition, FIG. 3 is a functional block diagram showing an embodiment of a constitution of a monitor station 30.

The unmanned vehicle shown in the FIG. 1 is made up of a communications device 11, a position measuring device 12, obstacle detection sensor 13, a superior controller 14 and a subordinate controller 15. In addition, as shown in FIG. 2, the manned vehicles 20 comprise a communications device 11, a position measuring device 12, a vehicle controller device 21 and a display device 22. The vehicles 10, 20 regularly report their position, measured by the position measuring device 12, their velocity and other travel conditions to the monitor station 30 using the communications device 11 whenever they pass a predetermined position on the travel track.

In other words, the communications device 11 comprises 2 radio channels, a radio channel 1 which is capable of transmitting at low frequency but over a wide area, and a radio channel 2 which is capable of transmitting at high frequency and with a fixed range. Therefore, by using radio channel 1 it is possible to make communications with the monitor station.

The position measuring device 12 is provided with a device which measures positions by means of GPS. In the GPS system, the current position of vehicles 10, 20 is measured by receiving radio waves from a GPS satellite. Additionally provided are a front axle rpm measuring device for measuring the rpm of the front axles of the vehicles 10, 20, a rear axle rpm measuring device for measuring the rpm of the rear axles of the vehicles 10, 20, a gyro (optical fiber gyro) for measuring the orientation. The current position of the vehicles 10, 20 is measured on the basis of the vehicle axle rpm values measured by means of the aforementioned front axle and rear axle rpm measuring devices and the vehicle orientation measured by means of the aforementioned gyro. In addition, the current velocity of the vehicles 10, 20 is measured by successively measuring their current position.

The superior controller 14 and the subordinate controller 15 which control the travel of the vehicle 10 along the travel track.

The superior controller 14 comprises a course data memory device 14*a* which records the track which the vehicle 10 is supposed to travel on as point sequence data (course data). In other words, the travel track is expressed as a sequence of points P1, P2, . . . Pn on the travel track. Then, the X-Y coordinate positions (X, Y), the orientation angle θ, the travel velocity v of vehicle 10 are respectively matched up for each point P1, P2, . . . Pn, and course data P1 (X1, Y1, θ1, v1), P2 (X2, Y2, θ2, v2), . . . Pn (Xn, Yn, θn, vn) are formed.

The obstacle detection sensor 13 are sensors which detect obstacles on the track of the unmanned vehicle 10.

In addition, the superior controller 14 makes radio communications with the outside. In addition, fixed amounts of data which have been stipulated in previous instructions from the monitor station in the past are stored in the superior controller 14. Then, the position controller 14 selects the course data from the monitor station 30 in compliance with the target position and travel track stipulated in the instruction from the monitor station 30.

In addition, if the if the course data corresponding to the instructed travel track has not been stored in the superior controller 14, or if the checksum of the stored data differs from the instructions, the superior controller 14 requests the monitor station 30 to transmit the course data.

On the basis of the current position of the vehicle 10 and the course data, the superior controller 14 generates, travel data according to which the vehicle moves only the specified distance (approximately 200 m) inside the displayed permitted region and stops. This travel data is generated at regular intervals (once every second) in accordance with the changes in the current position, and is transmitted to the subordinate controller 15 via a LAN (Local Area Network) inside the vehicle. If the permitted are is not displayed by the monitor station 30 this travel data ultimately travels to the extremity of the permitted area and becomes stop data.

The subordinate controller 15 controls the travel of the vehicle 10 by the control of steering, accelerating and brakes. The subordinate controller 15 controls the steering angle, brakes, transmission, engine speed and the like in the vehicle control device 21 of the unmanned vehicle 10. In the vehicle control device 21 of the manned vehicles 20, the brakes, engine speed and the like are controlled in accordance with operations performed by the operator. In addition, the subordinate controller 15 evaluates, based on this travel data and the current position of the vehicle 10, the current orientation and the tendency of the data, whether there is an obstacle detected by means of the obstacle detection sensor 13 on the travel track.

The current position and current velocity of the manned vehicle 20 are displayed on the display device 22 of the manned vehicle 20.

As shown in FIG. 3, the travel office 30 comprises the communications device 11, the memory device 12, the memory device 31, the component 32 for setting the destination and track, the component 33 for setting an area in which travel is permitted, a component 34 for setting an operation area/passing maneuver area, a component 35 for setting travel conditions and a graphic console 36.

The cycle time of each loading device (the loading operation time required for a loading device to load one vehicle), the operating conditions, the mineral component which is being loaded, the processing capacity of each hopper (mineral processing facility) per hour, the operating conditions, the mineral component being processed, the mineral components at the stock yard, the permitted stockyard capacity, the current position, the operating conditions, information stating whether or not a vehicle is loaded, the content of a load etc of each of the managed manned/unmanned dumper trucks 10, 20 are stored in the aforementioned memory device 31.

The component 32 for setting the destination and track generates a track enabling the vehicle to travel in the shortest time to that destination taking into account the destination of each vehicle (the target position) and how busy the track is in accordance with the cycle time of each loading device (the loading operation time for one loading device) stored in the memory device 31, the operating conditions, the mineral component which is being processed, the processing capacity of each hopper (mineral processing facility) per hour, the operating conditions, the mineral component being processed, the mineral components at the stock yard, the permitted stockyard capacity, the current position of each of the managed manned/unmanned dumper trucks 10, 20, the operating conditions, information stating whether or not a vehicle is loaded, and the aforementioned component 32 issues instructions to the appropriate vehicles 10, 20.

In order to avoid clashes between vehicles, a permitted travel area—that is an area in which a vehicle can travel without clashing with other vehicles—is indicated to each vehicle in the component 33 for setting a permitted travel area. This permitted travel area is calculated when necessary in accordance with the movements of the vehicles and indicated to the vehicles.

Figure 6A:
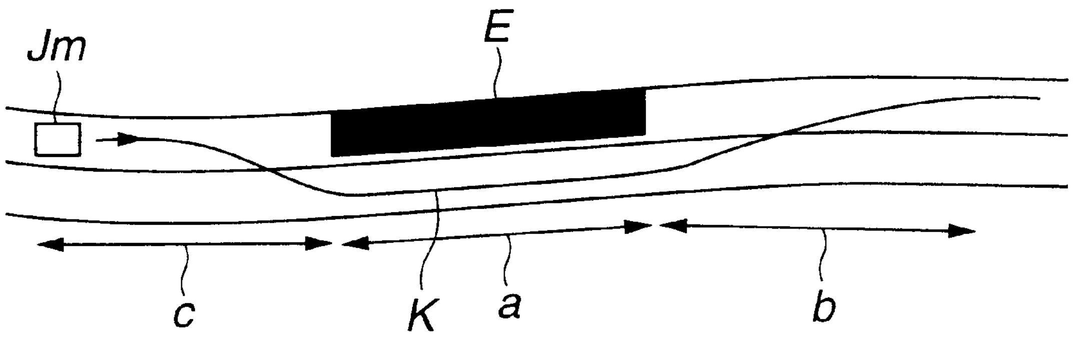
FIGS. 6(*a*) and 6(*b*) are diagrams explaining an a passing maneuver according to an embodiment of the invention.
Figure 6B:
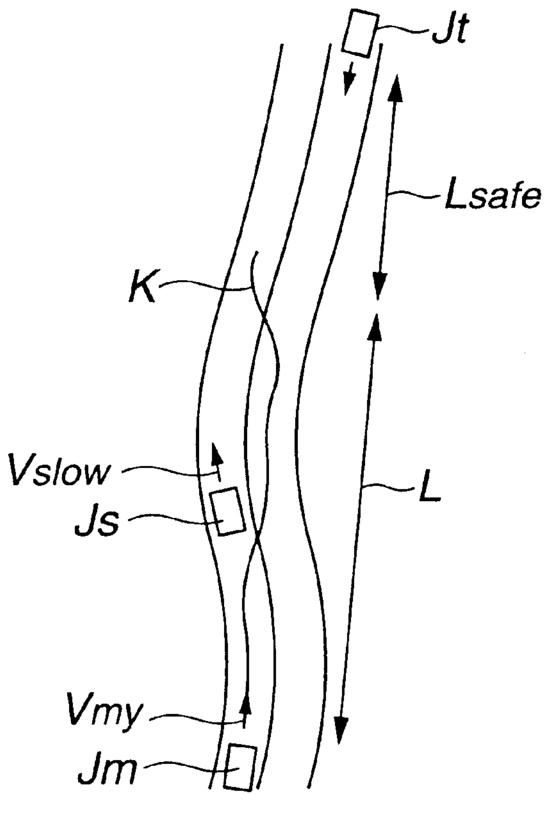

If an obstacle, a broken down vehicle, a low-velocity vehicle or the like has been detected on a travel track by the obstacle detection sensor 13 or if one has been defined on the graphic console 36, an operation area E is defined on a travel track by means of the obstacle detection sensor 13 ( see FIG. 6(*a*)). Furthermore, a passing course is defined in order to enable vehicles 10, 20 to pass a defined operation area E.

Travel conditions are set for the unmanned vehicles 10 and the manned vehicles 20 in the component 35 for setting travel conditions. These travel conditions are velocity limits, the velocity overwrite rate, the upper limiting value for the lateral acceleration, temporary stopping etc.

The aforementioned operation area E and travel conditions are set in the graphic console 36. The contents of the definitions of the graphic console 36 are displayed on a screen.

Figure 4:
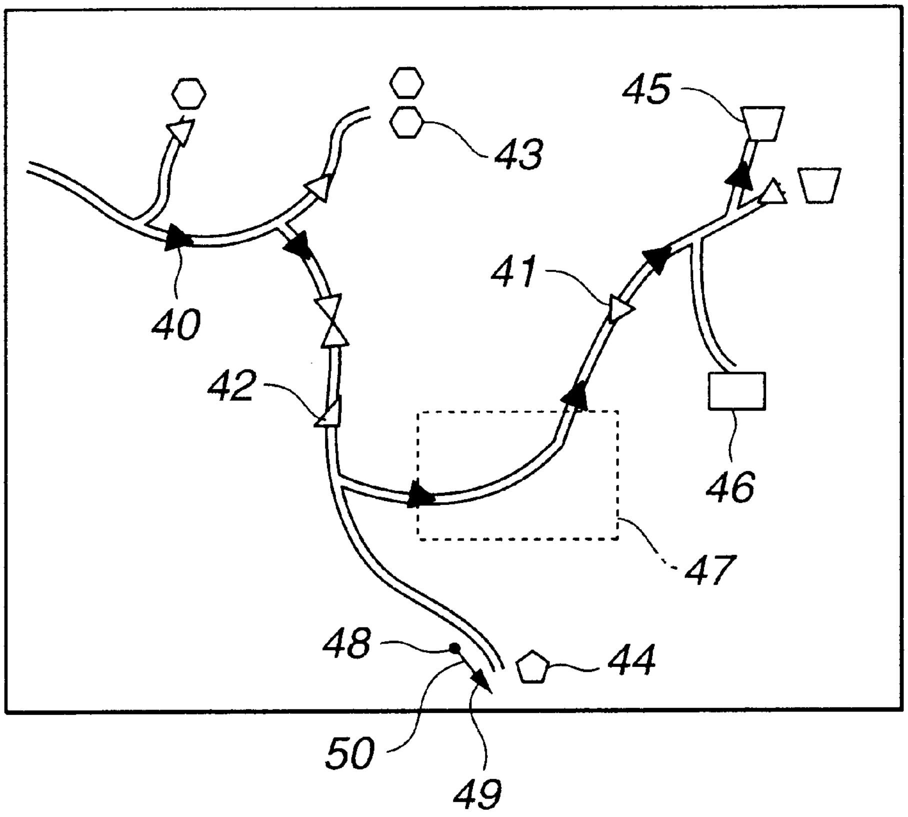
FIG. 4 is a diagram showing an display example of an display screen of a graphic console.

FIG. 4 shows a display sequence from the display screen of the graphic console 36.

In FIG. 4, the black equilateral triangles 40 represent unmanned vehicles 10 (unmanned dumpers) which are in the loaded state, and the white equilateral triangles 41 represent dumpers 10 in the unloaded state, the white right-angled triangles 42 represent manned vehicles, the hexagons 43 represent excavators, the pentagons 44 represent loaders, the trapezoid 45 whose upper side is longer than the bottom side represent hoppers and the rectangle represents a stockyard (temporary storage place).

The operator can set an arbitrary range on the graphic controller 36 and change the travel conditions of that range.

A defined range 47 of travel conditions indicated by a broken line on the figure is defined by the operator using his mouse to indicate the 2 points A and B on the opposite angle. Furthermore, the upper limit velocity and velocity limit overwrite rate and the upper limiting value for the lateral acceleration in the range 47 of set conditions are displayed and set.

The velocity limit overwrite rate is the rate at which the course data P1 (X1, Y1, θ1, v1), P2 (X2, Y2, θ2, v2), . . . (Xn, Yn, θn, vn) for the velocity v (in the case of unmanned vehicles 10) or the current travel velocity v (manned vehicles) are changed. The current rate corresponding to the current velocity v is set and the current velocity v is changed by multiplying this setting rate by the current velocity v. The lateral acceleration value is the acceleration in a lateral direction (to the right or left) which corresponds to the direction of travel of the vehicle 10, 20 which has been displayed and set in order to prevent the vehicles 10, 20 from slipping. It is possible to display the lateral acceleration a number of times. In addition, the lateral acceleration can be respectively made to correspond to three different types of weather (fine weather, rain and heavy rain) and the lateral acceleration can be set by selecting the type of weather.

In addition, the 2 points 48 and 49 on the travel track are successively instructed, by which it is enabled to set the temporary stopping position of vehicles 10, 20 and the temporary stopping direction. In other words, travel conditions are set according to which vehicles 10, 20 travel in the direction 50 connecting the two points 48, 49, pass through the vicinity of the point 48 indicated at the start and stop temporarily at the second point 49 which is indicated next.

When the type of travel condition (upper limit velocity, velocity overwrite rate, upper limit lateral acceleration, temporary stopping), the set range 47 of travel conditions and the set values are displayed, the monitor station 30 transmits the set range 47 of travel conditions and set values to the unmanned 10 and manned vehicles 20 as upper limit velocity limit instructions, velocity overwrite instructions, upper limit lateral acceleration instructions and temporary stopping instructions, via the communications device 11.

Below, explanation is given specifically with respect to the processing of cases involving the transmission of upper limit velocity limit instructions, overwrite instructions, upper limit lateral acceleration instructions and temporary stopping instructions.

When any of the aforementioned instructions is received by the communications device 11 in the unmanned vehicle 10, the travel data is generated in the superior controller based on the instructions.

Specifically, the velocity data inside the set range 47 of conditions is changed in accordance with the contents of the instructions. In addition, the velocity data in the set range 47 of conditions is changed in order to gradually change the travel velocity until it becomes the travel velocity set at the entrance to the set range 47 of conditions. If the vehicles are temporarily stopped, the velocity data is changed to make the vehicles stop at the stopping point 49. In addition, in order to reduce the travel velocity gradually until the vehicle stops at the stopping point 49, the velocity data is changed due to the temporary stoppage.

This changed velocity data vnew is stored separately from the course data P1 (X1, Y1, θ1, v1), P2 (X2, Y2, θ2, v2), . . . (Xn, Yn, θn, vn) in the aforementioned memory device 14*a*. Lastly, the velocity data v of the course data P1 (X1, Y1, θ1, v1), P2 (X2, Y2, θ2, v2), . . . (Xn, Yn, θn, vn) is updated.

In the superior controller 14, the course data stored in the course data memory device 14*a* and the velocity data vnew which has been changed are read out and travel data are generated. Then, travel data are transmitted from the superior controller 14 to the subordinate controller 15 and the travel of the vehicle 10 is controlled.

Below, explanation will be given on an individual basis for the processing of cases involving the transmission of upper limit velocity instructions, velocity overwrite instructions, upper limit acceleration velocity instructions and temporary stoppage instructions.

Upper Limit Velocity Instruction

When an upper limit velocity instruction is issued, the superior controller 14 compares the velocity v of the course data P(X, Y v) inside the set range 47 of conditions and the upper limit velocity value vu, and if the velocity v of the course data P (X Y, v) is higher than the upper limit velocity vu, the upper limit velocity vu is converted into a new velocity limit vnew. On the other hand, if the velocity of the course data P (X Y, v) is higher than the velocity of the course data P (X, Y, v), the superior controller 14 makes the velocity of the course data P (X, Y, v) into the velocity vnew., The travel data is generated in accordance with the velocity data vnew which has been changed in this way.

Velocity Overwrite Instruction

When the aforementioned velocity overwrite instruction is issued, the superior controller 14 computes in accordance with the above equation (1) and makes the overwrite rate for the velocity v of the course data P (X, Y, v) into the new velocity vnew.

$$Vnew = v \cdot \alpha \tag{1}$$

The travel data is generated in accordance with the velocity data vnew which has been changed in this way.

Upper Limit Lateral Acceleration Instruction

When an upper limit lateral acceleration instruction is issued, the superior controller 14 computes an upper limit velocity value in accordance with the lateral acceleration value. This upper limit velocity becomes a new velocity vnew.

The particulars of the computational processing of the upper limit velocity vnew will be explained with reference to FIG. 5.

Figure 5:
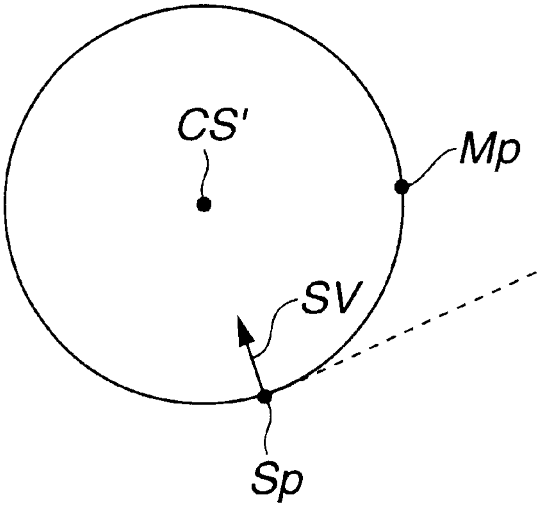
FIG. 5 is an explanatory diagram explaining a lateral acceleration instruction.

In FIG. 5, Sp is a point on the travel track and Mp is the next point on the travel track.

First, based on the point Sp on the travel track and its azimuth, a reference vector sv which forms a right angle to the vehicle 10 at the point Sp and faces in the in the direction of the next point Mp is obtained.

Next, based on the reference vector sv, the point Sp on the travel track and the next point Mp, the turning radius r is obtained for the vehicle 10 using the following equation (2).

$$R = |MP - Sp|2/2(Mp - Sp,\ sv) \tag{2}$$

Accordingly, the lateral acceleration gdata of the vehicle 10 is obtained from the following equation (3) using the velocity v and the turning radius r.

$$Gdata = v2/2r \tag{3}$$

If the lateral acceleration gdata obtained with the aforementioned equation (3) is greater than the upper limit lateral acceleration value gmax, a new velocity vnew corresponding to the upper limit lateral acceleration value gmax is obtained from the following equation (4).

$$Vnew = \sqrt{(2rgmax)} \tag{4}$$

In addition, if the lateral acceleration gdata obtained with the aforementioned equation (3) is below the aforementioned upper limit lateral acceleration value gmax, the velocity v of the course data P (X, Y, v) within the range of set conditions 47 becomes the new velocity vnew.

Travel data is generated using the velocity data vnew changed in this way as the upper limit velocity.

Next, an explanation will be given of the control for gradually reducing the sped until it becomes the aforementioned changed velocity vnew at the entrance to the conditions set region 47.

Figure 8:
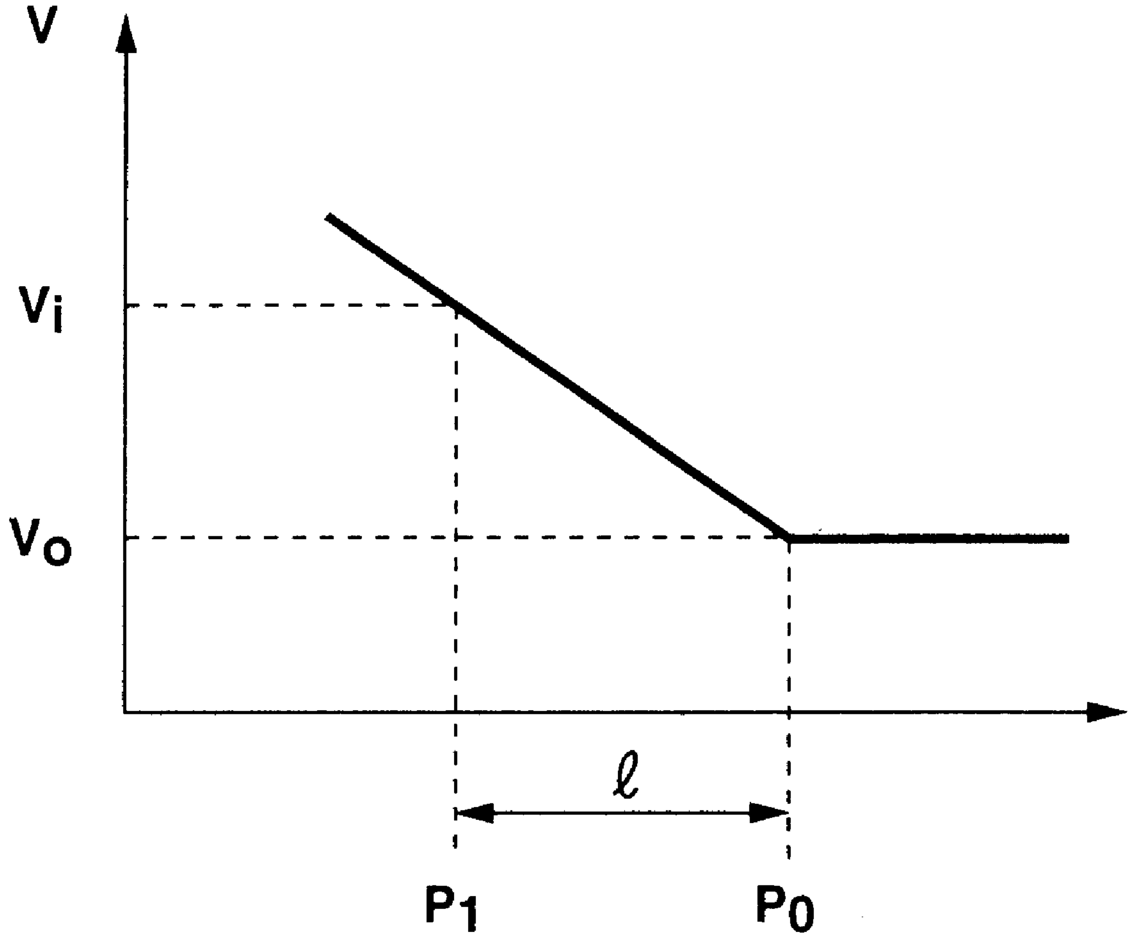
FIG. 8 is a diagram explaining the content of the deceleration control.

As shown in FIG. 8, the velocity at the point Pi before entering the conditions set region 47 is expressed by vnew, and the velocity at the point P0 at the entrance to the conditions set region 47 is expressed by v0. When the distance between point Pi and the point P0 is expressed by S and the deceleration rate expressed by a, the velocity vnew at the point Pi before entering the conditions set region 47 is obtained from the following equation (5).

$$Vnew = \sqrt{(Sa + v\mathbf{2})} \tag{5}$$

If the velocity vi of the course data Pi (Xi, Yi, vi) before enterng the conditions set region 47 is lower than the velocity vnew obtained by mean of the aforementioned equation (5), the velocity vi of the course data Pi (Xi, Yi, vi) is used as vnew.

In this way, the velocity data vnew is obtained at each point Pi before entering the conditions set region 47.

An explanation has been given of the case in which the velocity data vnew of each point Pi before entering the conditions set region 47 is obtained. When a temporary stop is made at the temporary stopping point 49, the same procedure can be adopted to obtain the velocity data vnew of each point Pi before entering the temporary stopping point 49.

The velocity data v of the course data P1 (X1, Y1, θ1, v1), P2 (X2, Y2, θ2, v2), . . . Pn (Xn, Yn, θn, vn) are rewritten by means of the velocity data vnew newly obtained in the above way.

Then, the vehicle 10 is controlled according to the course data rewritten in the way given above. Specifically, at the entrance to the section (the region for which conditions have been set) 47 of the track, the vehicle 10 is gradually decelerated at the deceleration a until it becomes the changed travel velocity v0. Then, when the vehicle 10 enters the entrance to the section 47 of the travel track, it travels on this section 47 at the aforementioned changed travel velocity v0.

Alternatively, the vehicle 10 is gradually decelerated at the deceleration a until it stops at the temporary stopping point 49.

Because the vehicle 10 is gradually decelerated in this way, unstable travel conditions such as when slippage of the rear wheels due to due to sudden deceleration is avoided and the vehicle is prevented from rolling over and the like.

In addition, in the present embodiment, the data transmittance load can be minimized, because the travel conditions need not be newly defined for all the sections of the travel tracks, and only travel conditions for the section 47 are newly defined and given as travel instructions. For this reason, when the travel conditions have been set or changed it becomes possible to transmit data quickly without causing the problem of the reduced production efficiency as a result of all the vehicles being stopped nor causing a safety problem due to the delay in the data changes.

In the embodiment described above, it is assumed that the instructions such as upper limit velocity limit instructions, velocity overwrite instructions, upper limit lateral acceleration instructions and temporary stopping instructions are not issued simultaneously. However, if the instructions are issued simultaneously, the aforementioned computational processing is carried out for the respective instructions and the minimal velocity among them can be used as the new velocity vnew.

Next, an explanation will be given of an embodiment in which, when the vehicle 10 is caused to travel on the oncoming lane to avoid an obstacle ahead of it, the vehicle can travel safely without a risk of a head-on collision.

If any of the following five conditions for a vehicle passing maneuver is fulfilled, the control system 30 issues an instruction to the vehicle 10 to carry out a passing maneuver.

(i) An obstacle is detected by the obstacle sensor 13 on the travel track ahead of the vehicle 10 and it has not been removed, (ii) On the travel track ahead of the vehicle 10, an obstacle is detected by the obstacle sensor 13 of another vehicle or found visually by a manned vehicle 20 and it has not been removed;

(iii) There is a broken down vehicle on the travel track ahead of the vehicle 10;

(iv) An operation area has been established on the travel track ahead of the vehicle 10; and (v) On the track ahead of the vehicle 10, there is a low-velocity vehicle 10 such as a grader which is traveling at a slower velocity than the vehicle 10, When obstacles or broken down vehicles are detected by obstacle detection sensors 13 and the detected positions of those obstacles or broken down vehicles are stored in the memory device 31, those areas at which those obstacles or broken down vehicles are located are defined as operation areas in the on-going operation area setting component 34 in the monitor station 30. In this way, the above conditions (i), (ii), and (iii) are fulfilled. The operation area which has been set can also be changed by the operator designating it on the console 36.

In addition, by the operator of the monitor station 30 designating on the graphic console 36 operation areas in which the grader is supposed to repair a road surface, an on-going operation area is set in the on-going operation area setting component 34 in the monitor station 30. In this way, the requirement (iv) is fulfilled.

In addition, when the position of the respective vehicles on the track is reported to the monitor station 30 and these positions of the vehicles are stored in the memory device 31, the area in which the low-velocity vehicle such as the grader or the like is located is defined as an on-going operation area in the on-going operation area setting component 34 in the monitor station 30. In this way, the aforementioned requirement (v) is fulfilled.

If any of the aforementioned conditions (i)–(iv) is fulfilled, the on-going operation area (obstacle, broken down vehicle or operation area) is defined as a no-entry area E for the vehicle 10 by the passing setting component 34 in the monitor station 30, and a passing course K is generated to avoid this no-entry area E.

More particularly, as shown in FIG. 6(*a*), if the length of the no-entry area E ahead of the vehicle 10 is expressed by a, the length necessary to return to the original lane from the oncoming vehicle lane is expressed by b, and the distance from the current position on the current vehicle lane to the no-entry area E ahead of the vehicle is expressed by c, the travel distance L necessary for the passing maneuver is obtained by means of the equation (6) below.

$$L=a+b+c$$

The passing course K with the length corresponding to this travel distance L is generated by the passing setting component 34 in the monitor station 30.

In addition, when (v) is fulfilled as well, the on-going operation area (low-velocity vehicle) is defined as a no-entry area E for the vehicle 10 by the passing setting component 34 in the monitor station 30, and a passing course K is defined in order to pass the low-velocity vehicle in this no-entry area E.

More particularly, as shown in FIG. 6(*b*), when the velocity of the vehicle (unmanned vehicle 10) Jm is expressed by vmy, the sum of the distance necessary for the vehicle Jm to change lanes, the distance to the low-velocity vehicle to be passed Js, and a margin is expressed by Lc (provided that, however, the distance necessary for the vehicle Jm to change lanes is greater the distance to the lo-velocity vehicle to be passed Js), the velocity of the low-velocity vehicle to be passed Js is expressed by vslow, the distance within which the oncoming vehicle Jt can safely stop is expressed by Lsafe, and the time necessary to pass is expressed by t, the following equation (7) is obtained.

$$Vslow\times t+Lc=vmy\times t \qquad (7)$$

And therefore the time necessary for passing is obtained from the following equation (8).

$$t=Lc/(vmy-vslow) \qquad (8).$$

Accordingly, the distance L necessary for the passing maneuver is obtained from the following equation (9).

$$L=Lc\times vmy/(vmy-vslow) \qquad (9).$$

It is preferable to add the delay time due to the telecommunications as a margin to the distance L necessary for the passing maneuver. The passing course K with the length corresponding to this travel distance is generated by the passing setting component 34 in the monitor station 30.

The monitor station 30 issues instructions to the vehicle Jm to carry out the passing maneuver, when the following three conditions for enabling passing maneuvers are fulfilled at the same time:

(a) The distance necessary for the vehicle Jm to change lanes is smaller than the distance to the low-velocity vehicle to be passed Js;

(b) The vehicle Jm is within a certain distance to the object to be passed; and (c) There is no oncoming vehicle Jt or intersection within the oncoming lane of the length of L+Lsafe from the current position of the low-velocity vehicle to be passed Js.

When the above conditions(a)–(c) are fulfilled at the same time, the monitor station 30 firstly transmits to the low-velocity vehicle to be passed Js an instruction requesting it to travel at the current velocity vslow as the upper limit velocity. Then a new travel permitted area, from which the above section L(the section of the oncoming lane on which the vehicle 10 travels) has been removed, is generated by the travel permitted area setting component 33, and an instruction is transmitted to the oncoming vehicle Jt traveling on the oncoming lane, requesting the same to travel on this new travel permitted travel area.

When the oncoming vehicle Jt and the low-velocity vehicle to be passed Js receive instructions from the monitor station 30, they evaluates the possibility of implementing the instruction. Then, the vehicles Jt and Js transmit the result of the evaluation back to the monitor station. In the passing setting component 34 in the monitor station 30, a passing course K for the vehicle Jm is generated based on the replies received from the oncoming vehicle Jt and low-velocity vehicle Js which have been transmitted back to the monitor station 30, and from the low-velocity vehicle Js. The monitor station 30 transmits to the vehicle Jm a passing instruction requesting it to travel along this passing course K. As a result of this, the vehicle Jm travels along the passing course K, passes the low-velocity vehicle Js ahead of it, temporarily traveling on the oncoming vehicle lane, and returns to the original lane.

The vehicle Jm, after having completed the passing maneuver, traveling along the passing course K, transmits an passing maneuver completion signal to the monitor station 30 and carries on traveling. The monitor station 30 which has received this passing maneuver completion signal generates a new permitted travel area to which the previously removed section L (the section of the oncoming lane on which the vehicle 10 travels) has been added, and transmits an instruction to the oncoming vehicle Jt traveling on the oncoming lane, requesting it travel on this new permitted travel area.

The procedure of the processing performed in the monitor station 30 will be explained below with reference to the flowchart shown in FIG. 7.

Figure 7:
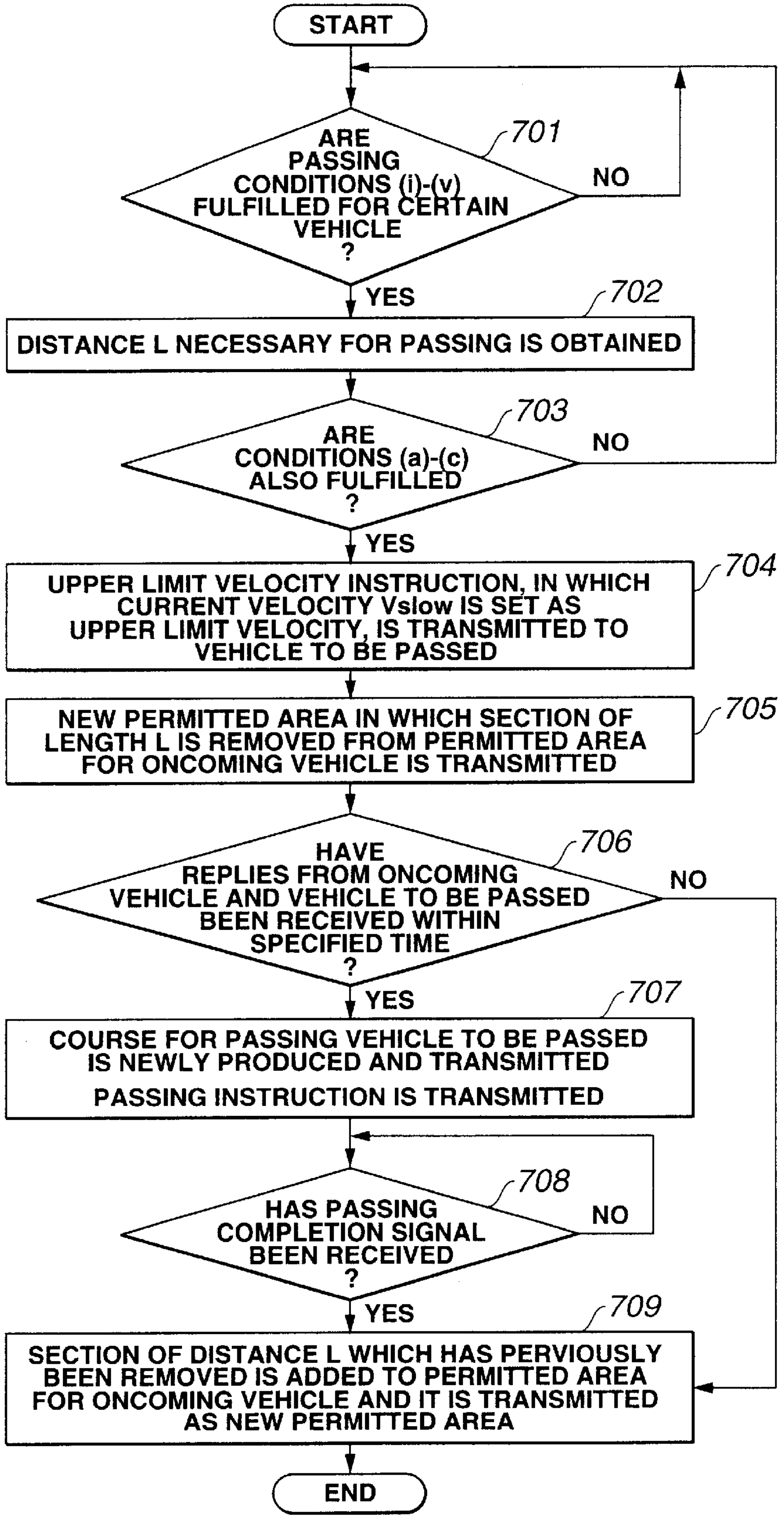
FIG. 7 is a flow chart showing a procedure for a passing maneuver according to an embodiment of the invention.

As shown in FIG. 7, it is assessed whether any of the conditions (i)–(v) for passing are fulfilled (step 701).

If any of the conditions (i)–(v) for passing is fulfilled (step 701) (the result of the evaluation in the step 701 is yes), the distance L necessary for passing is obtained next (step 702) because there is a low-velocity vehicle Js ahead of the vehicle Jm.

On the other hand, if any of the conditions (i)–(v) is not fulfilled (the result of the evaluation in 701 is no), it is assessed once again whether the aforementioned conditions (i)–(v) are fulfilled because there is no low-velocity vehicle Js ahead of the vehicle Jm.

It is further assessed (step 703) whether all the conditions for enabling a passing maneuver (a)–(c) are fulfilled at the same time.

If the aforementioned conditions (a)–(c) are not fulfilled (the result of the step 703 assessment is no), the sequence is moved back to the first step 701.

On the other hand, if the aforementioned conditions (a)–(c) are fulfilled at the same time(the result of the step 703 assessment is yes), an upper limit velocity instruction to limit the velocity to the current velocity vslow is transmitted to the low-velocity vehicle Js which is to be passed. In this way, the low-velocity vehicle Js does not need to increase its velocity and can carry on traveling at the same low-velocity (step 704).

Next, in the travel permitted area setting component 33, a new travel permitted area in which the section of the distance L has been removed from the permitted travel area of the oncoming vehicle Jt is generated, and an instruction is transmitted from the monitor station 30 to the oncoming vehicle Jt, instructing the same to travel in this new travel permitted travel area. As a result, the oncoming vehicle Jt can travel without entering the section L on the oncoming lane on which the vehicle Jm is traveling(step 705).

Next, it is assessed whether the replies from the low velocity vehicle Js and the oncoming vehicle Jt have been received by the monitor station 30 within a prescribed period after the instructions have been respectively given to the low-velocity vehicle and the oncoming vehicle Jt (step 706).

If it is assessed that the replies have not been received by the monitor station 30 (the result of the step 706 assessment is no), the sequence moves to the following step 709.

On the other hand, if it is assessed that the replies have been received by the monitor station 30 (the result of the step 706 assessment is yes), a passing course K is generated in the passing setting component 34, and a passing instruction is transmitted to the vehicle Jm to travel along this passing course K and to carry out a passing maneuver. As a result, the vehicle Jm travels along the passing course K, passes the low-velocity vehicle Js ahead of it, traveling temporarily on the oncoming lane, and returns to the original lane. During this, the oncoming vehicle Jt can travel without entering the section L of the oncoming lane on which the vehicle Jm is traveling. For this reason, when the vehicle Jm is traveling on the oncoming lane, the risk of a head-on collision with the oncoming vehicle Jt can be avoided (step 707).

Next, it is assessed whether the passing completion signal from the vehicle Jm has been received by the monitor station 30 (step 708).

If the passing completion signal from the vehicle Jm has been received by the monitor station 30 (the result of the assessment step 708 is yes), the section indicated by the distance L which has previously been removed is added to the travel permitted area of the oncoming vehicle Jt by the travel permitted area setting component 33, and a new travel permitted area is generated. This new travel permitted area is transmitted to the oncoming vehicle Jt. As a result of this, the oncoming vehicle Jt can carry on traveling, passing by the vehicle Jm (step 709).

On the other hand, if the passing completion signal from the vehicle Jm has not been received at the monitor station 30 (the result of the assessment step 708 is no), the sequence returns to step 708 and it is assessed once more whether the passing completion signal has been received, As described above, in this embodiment, a no-entry areas E (obstacle, broken-down vehicle, low-velocity vehicle Js) is established ahead of one vehicle Jm traveling on one lane of a 2-way dual-lane vehicle track, travel instructions are issued to the aforementioned vehicle Jm traveling on the aforementioned lane, the aforementioned travel instructions causing the vehicle Jm to avoid the aforementioned no-entry area and travel on a section L of an oncoming lane, a lane whose traffic runs in the opposite direction to the aforementioned lane, and travel instructions are issued to an oncoming vehicle Jt traveling on the aforementioned oncoming lane which prohibit entry to the aforementioned section L so that even if the aforementioned vehicle Jm avoids the no-entry area E ahead and travels on the oncoming lane, there is no risk of a head-on collision between the vehicle Jm and the vehicle Jt traveling in the opposite direction and they can travel safely.

In the present embodiment, it is assumed that the low-velocity vehicle Js which is to be passed maintains its present velocity. However, for safety's sake it is also possible to temporarily stop or decelerate the low-velocity vehicle Js.

In addition, in this embodiment, it is assumed that the system of the present invention is applied to ordinary operations in a mine in which the distance between vehicles exceeds 1 km. For this reason, in the normal operating environment, a situation is not generated in which vehicles wait on one lane. However, depending on the concentration of vehicles, there are inevitably situations in which vehicles wait on one lane. In such cases, it is possible to assign a priority level to the waiting vehicles according to the number of vehicles in the line and the order of priority of the operations.

Furthermore, if only vehicles traveling on either one lane of a 2-way dual-lane track are permitted to carry out passing maneuvers, there is the risk that the oncoming vehicles will not be able to travel. In this regard, it is possible to determine a time when the vehicles are permitted to perform passing operations for each of the lanes, so that the vehicles on the opposite perform passing alternately. In either case, the monitor station 30 controls the travel track of the oncoming vehicle Jt traveling on the oncoming lane and the travel track of the vehicle Jm which is performing a passing maneuver so that they will not clash with each other.

In addition, in this embodiment, as shown in FIG. 3, the monitor station 30 is provided separately from the vehicles 10, 20. However, it is also possible to provide the function of the monitor station 30 inside the unmanned vehicle 10. In this case, the communication device which carries out the radio communications between this unmanned vehicle 10 and the external monitor station 30 becomes unnecessary. It is only required to provide a communication device which performs radio communications between the vehicles.

What is claimed is:

1. A vehicle travel control system in which travel conditions of a travel track made up of 2-way dual-lane vehicle tracks on which a plurality of vehicles travel are monitored by a monitor station, and travel instructions are issued to the plurality of vehicles from the monitor station; comprising means for setting a no-entry area which, on the basis of the monitored result of the travel conditions of the travel track, sets the no-entry area ahead of one of the vehicles traveling on one lane of the 2-way dual-lane vehicle track;

first instruction means which issues to the one of the vehicles travel instructions which cause the vehicle to avoid the no-entry area and travel on a section of an oncoming lane whose traffic runs in an opposite direction to the one lane; and second instruction means which issues to an oncoming vehicle traveling on the oncoming lane travel instructions which prohibit entry to the section of the oncoming lane.

2. A vehicle travel control system according to claim 1, further comprising means for setting prohibited sections in which it is prohibited for the one of the vehicles to travel on the oncoming lane; wherein, if aid section of the oncoming lane is not the prohibited section, the first instruction means and the second instruction means issue the travel instructions to the one of the vehicles and to the oncoming vehicle.

3. A vehicle travel control system in which travel conditions of a travel track on which a vehicle travels are set by a monitor station and travel instructions corresponding to the travel conditions are issued to the vehicle by the monitor station, comprising means for setting an upper limit velocity which sets the upper limit velocity on a section of the travel track; and instruction means for issuing, as the travel instructions to the vehicle, travel conditions including the set upper limit velocity for the section of the travel track;

wherein, when the travel instructions are issued by the instruction means, the vehicle travels on the section of the travel track at a velocity which does not exceed the upper limit velocity.

4. A vehicle travel control system according to claim 3, wherein, when the travel instructions are issued by the instruction means, the vehicle gradually decreases a travel speed so as to reach a velocity instructed for the section or so as to stop traveling at the stopping point.

5. A vehicle travel control system in which travel conditions of a travel track system on which a vehicle travels are changed by a monitor station and travel instructions corresponding to the changed travel conditions are issued to the vehicle from the monitor station; comprising travel velocity changing means for changing a travel velocity on a section of the travel track; and instruction means for issuing, as the travel instructions to the vehicle, travel conditions including the changed travel velocity for the section of the travel track;

wherein, when the travel instructions are issued by the instruction means, the vehicle travels on the section of the travel track at the changed velocity.

6. A vehicle travel control system according to claim 5, wherein, when the travel instructions are issued by the instruction means, the vehicle gradually decreases a travel speed so as to reach a velocity instructed for the section or so as to stop traveling at the stopping point.

7. A vehicle travel control system which is applied to a travel track on which a vehicle slips in accordance with a lateral acceleration applied in a lateral direction relative to a direction of travel of the vehicle, and in which travel conditions for the travel track on which the vehicle is traveling are set by a monitor station and travel instructions corresponding to the travel conditions are issued to the vehicle by the monitor station; comprising lateral acceleration setting means for setting an upper limit value for the lateral acceleration on a section of part of the travel track; and instruction means for issuing, as the travel instructions to the vehicle, travel conditions including an upper limit velocity corresponding to the lateral acceleration for the section of the part of the travel track;

wherein, when the travel instructions are issued by the instruction means, the vehicle travels on the section of the travel track at a velocity not exceeding the upper limit velocity.

8. A vehicle travel control system according to claim 7, wherein, when the travel instructions are issued by the instruction means, the vehicle gradually decreases a travel speed so as to reach a velocity instructed for the section or so as to stop traveling at the stopping point.

9. A vehicle travel control system in which travel conditions of a travel track system on which a vehicle travels are set by a monitor station and travel instructions corresponding to the travel conditions are issued to the vehicle by the monitor station, comprising:

means for setting a stopping point which sets at one point on the travel track a stopping point at which the vehicle is supposed to stop traveling; and instruction means for issuing, as the travel instructions to the vehicle, travel conditions including the stopping point, wherein when the travel instructions are issued by the instruction means, the vehicle stops at the stopping point.

10. A vehicle travel control system according to claim 9, wherein, when the travel instructions are issued by the instruction means, the vehicle gradually decreases a travel speed so as to reach a velocity instructed for the section or so as to stop traveling at the stopping point.

* * * * *